J. J. BAILEY.
Velocipede.
No. 161,924.
Patented April 13, 1875.
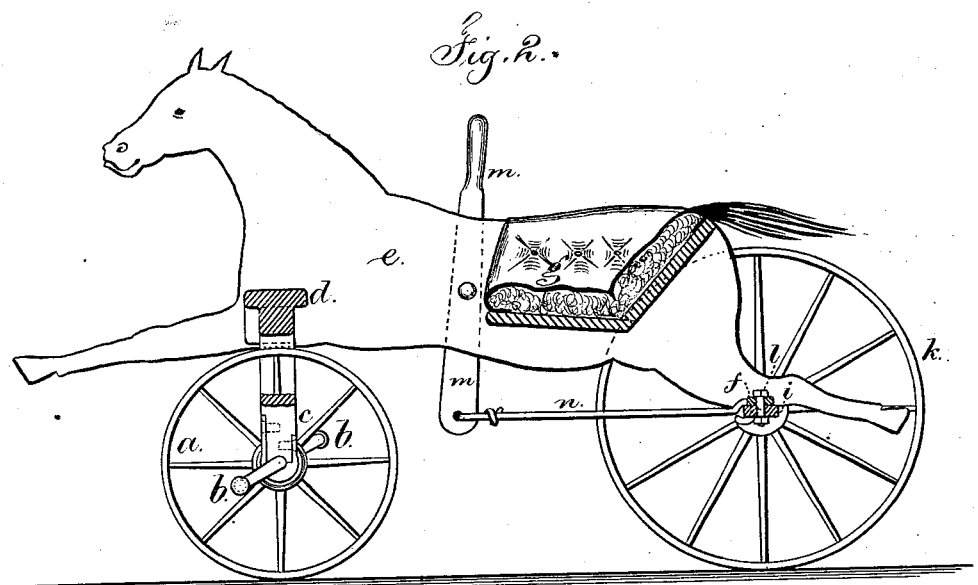
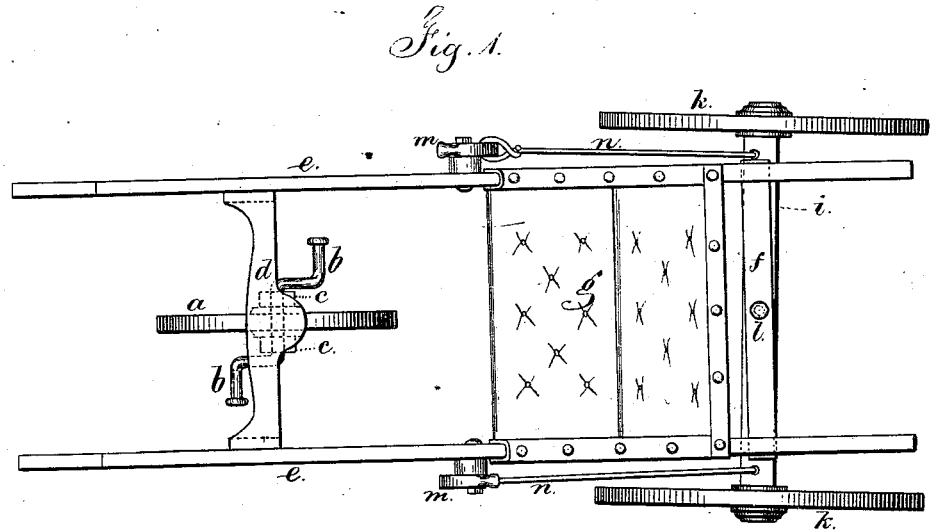

UNITED STATES PATENT OFFICE.

JOHN J. BAILEY, OF NEW YORK, N. Y.

IMPROVEMENT IN VELOCIPEDES.

Specification forming part of Letters Patent No. 161,924, dated April 13, 1875; application filed September 10, 1874.

*To all whom it may concern:*

Be it known that I, JOHN J. BAILEY, of the city and State of New York, have invented an Improvement in Velocipedes, of which the following is a specification:

There have been velocipedes constructed with a seat, and with a swinging lever connected at its ends with links to cranks on the back wheels, and in other cases the front wheel has had crank-arms and foot-pieces.

The first-named velocipede is unhandy in use and costly to construct, and the other one is not adapted to the use of girls on account of the center bar passing from the front wheel to the seat.

My present invention is made for adapting the velocipede with the cranks upon the front wheel to the use of girls; and consists in a seat upon the two hind wheels, with side pieces to the cross-bar sustaining the front wheel, whereby there is an opening left for the feet and legs to act upon the cranks of the front wheel. The axle of the hind wheel is pivoted, so as to be swung in steering the velocipede, and handles at the sides connect with the axle for this purpose.

A velocipede has also been made with two front wheels connected together by a cranked axle, and the said axle has been sustained by bearings in the side pieces of the frame.

In the drawing, Figure 1 is a plan of the velocipede, and Fig. 2 is a vertical section of the same.

The front wheel $a$ is provided with cranks $b$, and sustained between the jaws $c$, as usual, with the exception that it is preferable that the front-wheel jaws should be rigidly connected to the cross-piece $d$ and not swivel. The cross-piece $d$ is between the sides $e$ $e$ that are ornamented and made in the form of horses, swans, or other figures, and these side pieces $e$ $e$ extend to the cross-bar $f$, and receive between them the seat $g$, that is positioned so that there will be the distance between the seat and the cranks required for the convenient movement of the limbs in operating the cranks and propelling the velocipede. The axle $i$ of the rear wheels $k$ is upon a king-bolt, $l$, so as to be turned by the hand-levers $m$ and connections $n$, and the velocipede steered thereby.

This velocipede can be made very cheaply, and is adapted especially to the use by girls, and, as the clothing is confined within the sides, there is nothing objectionable in its use.

I remark that there may be a guard connected with the cross-bar $d$ and jaws $c$, to protect the clothing from contact with the front wheel.

I claim as my invention—

The velocipede with the sides $e$ and cross-bar $d$, sustaining the jaws $c$ of the front wheel $a$, having crank-arms $b$, and with the hand-wheels $k$ and axle $i$, movable for steering, all combined substantially as set forth.

Signed by me this 7th day of September, A. D. 1874.

JOHN J. BAILEY.

Witnesses:
 CHAS. H. SMITH,
 HAROLD SERRELL.